US012779947B2

(12) United States Patent
Sugawara et al.

(10) Patent No.: US 12,779,947 B2
(45) Date of Patent: Nov. 3, 2026

(54) IN-VEHICLE DEVICE TEMPERATURE ADJUSTMENT APPARATUS

(71) Applicant: MIKUNI CORPORATION, Tokyo (JP)

(72) Inventors: Hideyuki Sugawara, Odawara (JP); Ryuta Sato, Odawara (JP)

(73) Assignee: MIKUNI CORPORATION, Tokyo (JP)

( * ) Notice: Subject to any disclaimer, the term of this patent is extended or adjusted under 35 U.S.C. 154(b) by 204 days.

(21) Appl. No.: 18/733,983

(22) Filed: Jun. 5, 2024

(65) Prior Publication Data

US 2024/0399832 A1 Dec. 5, 2024

(30) Foreign Application Priority Data

Jun. 5, 2023 (JP) ................................ 2023-092398

(51) Int. Cl.
*B60H 1/04* (2006.01)
*B60H 1/00* (2006.01)
(Continued)

(52) U.S. Cl.
CPC ........... *B60H 1/04* (2013.01); *B60H 1/00885* (2013.01); *B60H 2001/00928* (2013.01);
(Continued)

(58) Field of Classification Search
CPC .................. B60H 1/00885; B60H 1/04; B60H 2001/00928; B60H 2001/00307; B60K 11/02; B60Y 2200/92
See application file for complete search history.

(56) References Cited

U.S. PATENT DOCUMENTS 11,351,838 B2 * 6/2022 Kim .................... H01M 10/625
11,448,334 B2 * 9/2022 Jeong .................. F16K 11/0856
(Continued)

FOREIGN PATENT DOCUMENTS

JP 6079417 2/2017

*Primary Examiner* — Nelson J Nieves
(74) *Attorney, Agent, or Firm* — STAAS & HALSEY LLP

(57) ABSTRACT

An in-vehicle device temperature adjustment apparatus of the present invention includes: a first temperature adjustment circuit (2) circulating a first heat medium to adjust a temperature of a first device (4); a second temperature adjustment circuit (3) circulating a second heat medium to adjust a temperature of a second device (5); and a mixing valve (16) that is provided between the first temperature adjustment circuit (2) and the second temperature adjustment circuit (3), and mixes the first and second heat media to flow out to each of the temperature adjustment circuits (2, 3) as a mixed heat medium. The temperature adjustment apparatus controls a mixing valve (16) by calculating a target outflow temperature tgtTout of the mixed heat medium flowing out to the second temperature adjustment circuit (3), calculating the ratio of the first heat medium contained in the mixed heat medium as a flow ratio R based on inflow temperatures Tin1 and Tin2 of the first and second heat media and an outflow temperature Tout of the mixed heat medium, calculating an opening degree correction coefficient K from the flow ratio R and an opening degree θ of the mixing valve (16), calculating a target flow ratio tgtR from the inflow temperatures Tin1 and Tin2 and a target outflow temperature tgtTout, and calculating a target opening degree tgtθ of the mixing valve (16) from the opening degree correction coefficient K and the target flow ratio tgtR.

15 Claims, 10 Drawing Sheets

(51) Int. Cl.
*B60K 6/28* (2007.10)
*B60K 11/02* (2006.01)

(52) U.S. Cl.
CPC ................. *B60K 6/28* (2013.01); *B60K 11/02* (2013.01); *B60Y 2200/92* (2013.01); *B60Y 2306/05* (2013.01); *B60Y 2400/61* (2013.01)

(56) References Cited

U.S. PATENT DOCUMENTS

| | | | | |
|---|---|---|---|---|
| 2015/0217622 | A1* | 8/2015 | Enomoto | F16K 11/076<br>62/244 |
| 2015/0258875 | A1* | 9/2015 | Enomoto | B60K 11/02<br>165/104.31 |
| 2016/0167481 | A1* | 6/2016 | Makihara | B60H 1/03<br>237/5 |
| 2018/0201098 | A1* | 7/2018 | Katoh | F25B 5/04 |
| 2018/0354344 | A1* | 12/2018 | Miura | B60H 1/08 |
| 2023/0182524 | A1* | 6/2023 | Yang | H01M 10/6568<br>429/120 |
| 2023/0366340 | A1* | 11/2023 | Baek | F01P 11/029 |
| 2024/0190202 | A1* | 6/2024 | Jeong | B60H 1/00278 |
| 2024/0326562 | A1* | 10/2024 | Kobayashi | B60H 1/00899 |
| 2024/0408934 | A1* | 12/2024 | Kuepper | B60H 1/00278 |
| 2025/0026191 | A1* | 1/2025 | Griessl | B60H 1/00392 |

* cited by examiner

IN-VEHICLE DEVICE TEMPERATURE ADJUSTMENT APPARATUS

CROSS-REFERENCE TO RELATED APPLICATIONS

This application is based on and hereby claims right of priority under 35 USC 119 to Japanese Application No. 2023-092398, filed Jun. 5, 2023, in the Japan Patent Office, the entire contents of which are incorporated herein by reference.

BACKGROUND OF THE INVENTION

Field of the Invention

The present invention relates to an in-vehicle device temperature adjustment apparatus.

Description of the Related Art

As an in-vehicle device temperature adjustment apparatus, for example, Patent Literature 1 discloses a hybrid vehicle using an engine and a motor as a travel power source, and utilizes the heat of engine cooling water for warming a travel battery that drives a motor during the stoppage of the engine.

The temperature adjustment apparatus includes a switching valve between the cooling water circuit of the engine and the cooling water circuit of the travel battery and enables the exchange of the cooling water between these circuits in response to the switching of the switching valve. For example, when the battery temperature is lower than the warm-up start temperature and requires warm-up, and the engine cooling water temperature is equal to or higher than the lower temperature limit and equal to or lower than the upper temperature limit, the switching valve is opened to connect both the cooling water circuits. This directs the engine cooling water to the travel battery, where its heat warms the travel battery.

When the engine cooling water temperature is higher than the upper temperature limit, it is conceivable to cause heat to be dissipated by a radiator provided in the engine cooling water circuit. However, this leads to the wastage of the heat of the engine cooling water. Therefore, in this case, the switching of the switching valve is controlled to mix the engine cooling water and the battery cooling water at a predetermined ratio. The engine cooling water, lowered in temperature by mixing with the battery cooling water, is directed to the travel battery for warming up. At this time, control is exerted not only on the opening degree of the switching valve but also on other factors such as the rotational speed of a pump that circulates the cooling water in each cooling water circuit.

CITATION LIST

Patent Literature

Patent Literature 1: Japanese Patent No. 6079417

SUMMARY OF THE INVENTION

However, the above method is not feasible because Patent Literature 1 does not describe specific details on the control executed during the mixing of the engine cooling water and the battery cooling water, that is, details on controlling the opening degree of the switching valve, the rotation of the pump, and other factors.

An object of the present invention, which has been made to solve such a problem, is to provide an in-vehicle device temperature adjustment apparatus that can more properly mix heat media circulating in first and second temperature adjustment circuits, respectively, using a mixing valve to effectively utilize the heat media for temperature control of an in-vehicle device.

To achieve the above object, an in-vehicle device temperature adjustment apparatus of the present invention includes: a first temperature adjustment circuit circulating a heat medium as a first heat medium to adjust a temperature of a first in-vehicle device; a second temperature adjustment circuit circulating the heat medium as a second heat medium to adjust a temperature of a second in-vehicle device; a mixing valve mixing the first heat medium flowing in from the first temperature adjustment circuit and the second heat medium flowing in from the second temperature adjustment circuit, at a ratio corresponding to an opening degree, to flow out to each of the first temperature adjustment circuit and the second temperature adjustment circuit as a mixed heat medium; a valve opening degree detection unit detecting the opening degree of the mixing valve; a first inflow temperature detection unit detecting, as a first inflow temperature, a temperature of the first heat medium flowing in from the first temperature adjustment circuit to the mixing valve; a second inflow temperature detection unit detecting, as a second inflow temperature, a temperature of the second heat medium flowing in from the second temperature adjustment circuit to the mixing valve; an outflow temperature detection unit detecting, as an outflow temperature, a temperature of the mixed heat medium flowing out from the mixing valve to the second temperature adjustment circuit; and a mixing control unit performing opening degree control on the mixing valve to mix the first heat medium and the second heat medium when the temperature of the second in-vehicle device needs to be adjusted. The mixing control unit includes a target outflow temperature calculation unit calculating, as a target outflow temperature, a target value of the outflow temperature based on at least the temperature of the second in-vehicle device, a flow ratio calculation unit calculating, as a flow ratio, a ratio of the first heat medium contained in the mixed heat medium flowing out from the mixing valve to the second temperature adjustment circuit, based on the first inflow temperature, the second inflow temperature, and the outflow temperature, an opening degree correction coefficient calculation unit calculating an opening degree correction coefficient defining a relationship between the flow ratio and the opening degree, based on the flow ratio and the opening degree of the mixing valve, a target flow ratio calculation unit calculating, as a target flow ratio, a target value of the flow ratio based on the first inflow temperature, the second inflow temperature, and the target outflow temperature, a target opening degree calculation unit calculating a target opening degree of the mixing valve based on the opening degree correction coefficient and the target flow ratio, and a valve drive unit performing opening degree control on the mixing valve based on the target opening degree.

As another aspect, the target outflow temperature calculation unit, the flow ratio calculation unit, the opening degree correction coefficient calculation unit, the target flow ratio calculation unit, the target opening degree calculation unit, and the valve drive unit may repeat their respective processes at predetermined control intervals.

As another aspect, the mixing control unit may further include a stabilization determination unit determining whether a mixed state of the first heat medium and the second heat medium corresponding to the opening degree control of the mixing valve has been stabilized, and a feedback control unit executing feedback control including at least one of an integral term or a differential term, obtained from a deviation between the outflow temperature and the target outflow temperature. The feedback control unit may start the feedback control when the stabilization determination unit determines that the outflow temperature has been stabilized after starting of the opening degree control of the mixing valve.

As another aspect, the mixing control unit may control the opening degree of the mixing valve to warm the second in-vehicle device when the outflow temperature is lower than the target outflow temperature and the first inflow temperature is equal to or higher than the target outflow temperature.

As another aspect, the mixing control unit may control the opening degree of the mixing valve to cool the second in-vehicle device when the outflow temperature is equal to or higher than the target outflow temperature and the first inflow temperature is lower than the target outflow temperature.

As another aspect, one of the first temperature adjustment circuit and the second temperature adjustment circuit may be a powertrain cooling water circuit that adjusts a temperature of a powertrain for causing a vehicle to travel, and the other of the first temperature adjustment circuit and the second temperature adjustment circuit may be a battery cooling water circuit for adjusting a temperature of a travel battery.

As another aspect, one of the first temperature adjustment circuit and the second temperature adjustment circuit may be an air-conditioning core cooling water circuit for adjusting a temperature of an air-conditioning core of a vehicle, and the other of the first temperature adjustment circuit and the second temperature adjustment circuit may be a battery cooling water circuit for adjusting a temperature of a travel battery.

As another aspect, one of the first temperature adjustment circuit and the second temperature adjustment circuit may be an air-conditioning core cooling water circuit for adjusting a temperature of an air-conditioning core of a vehicle, and the other of the first temperature adjustment circuit and the second temperature adjustment circuit may be a powertrain cooling water circuit for adjusting a temperature of a powertrain for causing the vehicle to travel.

As another aspect, the powertrain may be an engine installed in the vehicle as a travel power source.

As another aspect, the powertrain may include a travel motor installed in the vehicle as a travel power source, an inverter for driving the travel motor, and a direct current to direct current (DC-DC) converter.

According to the in-vehicle device temperature adjustment apparatus of the present invention, the heat media circulating in the first and second temperature adjustment circuits, respectively, can be more properly mixed using a mixing valve to effectively utilize the heat media for the temperature control of the in-vehicle device.

DETAILED DESCRIPTION OF THE INVENTION

First Embodiment

In the following, a first embodiment will be described, where the present invention is embodied in an in-vehicle device temperature adjustment apparatus installed in a hybrid vehicle.

Figure 1:
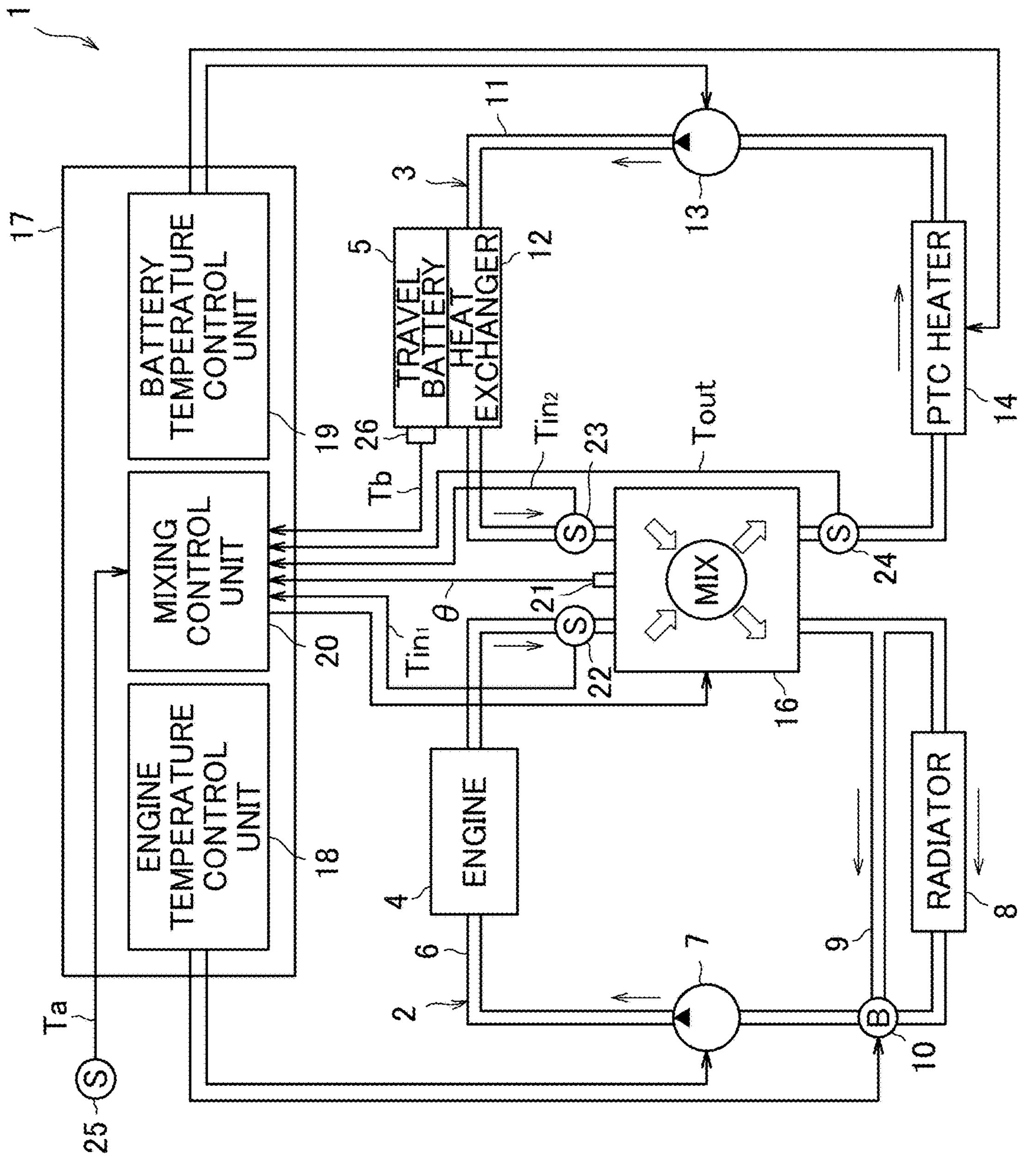
FIG. 1 is a circuit diagram illustrating a temperature adjustment apparatus according to a first embodiment.

FIG. 1 is a circuit diagram illustrating a temperature adjustment apparatus of the present embodiment.

A hybrid vehicle (not illustrated) (hereinafter, sometimes referred to simply as a vehicle) is equipped with an engine and a motor as a travel power source. Although the basic configuration of the hybrid vehicle is well known and will not be described in detail, the vehicle travels while appropriately switching the travel power source according to the driver's accelerator operation, the travel conditions of the vehicle, and other factors. The engine generates heat associated with its operation and needs to be maintained in a temperature range where good exhaust gas performance and fuel consumption performance can be obtained. In addition, the travel battery for driving the motor also generates heat associated with its charge and discharge and needs to be maintained in a temperature range where good charge and discharge performance can be obtained. Thus, a temperature adjustment apparatus 1 illustrated in FIG. 1 is installed in the vehicle, and an engine cooling water circuit 2 thereof adjusts the temperature of an engine 4, and a battery cooling water circuit 3 thereof adjusts the temperature of a travel battery 5.

More specifically, the engine 4, a cooling water pump 7, and a radiator 8 are interposed in an annular flow path 6 of the engine cooling water circuit 2, and the cooling water discharged from the cooling water pump 7 circulates through the flow path 6 as engine cooling water. In the flow path 6, a bypass path 9 is formed to bypass the radiator 8, and a bypass valve 10 is interposed at one end of the bypass path 9. In response to the switching of the bypass valve 10, the cooling water is passed through or bypasses the radiator 8, and during the passage, the cooling water is dissipated by the radiator 8. Such switching of the bypass valve 10 maintains the engine cooling water, and thus the engine 4, in a suitable temperature range.

A battery heat exchanger 12 built in the travel battery 5, a cooling water pump 13, and a positive temperature coefficient (PTC) heater 14 are interposed in the annular flow path 11 of the battery cooling water circuit 3, and the cooling water discharged from the cooling water pump 13 circulates through the flow path 11 as the battery cooling water. During the operation of the PTC heater 14, the temperature of the battery cooling water is appropriately raised, and heat is exchanged between the battery cooling water and the travel battery 5 via the battery heat exchanger 12 to maintain the travel battery 5 in a suitable temperature range.

In the present embodiment, the engine cooling water circuit 2 corresponds to the "first temperature adjustment circuit" and the "powertrain cooling water circuit" of the present invention, the battery cooling water circuit 3 corresponds to the "second temperature adjustment circuit" of the present invention, the engine 4 corresponds to the "first in-vehicle device" and the "powertrain" of the present invention, and the travel battery 5 corresponds to the "second in-vehicle device" of the present invention. The cooling water corresponds to the "heat medium" of the present invention, the engine cooling water corresponds to the "first heat medium" of the present invention, and the battery cooling water corresponds to the "second heat medium" of the present invention.

The engine cooling water circuit 2 and the battery cooling water circuit 3 are connected to each other via the mixing valve 16, thereby constituting the temperature adjustment apparatus 1. The engine cooling water circulating in the engine cooling water circuit 2 and the battery cooling water circulating in the battery cooling water circuit 3 flow in each case into the mixing valve 16, and then flow out from the mixing valve 16 to the engine cooling water circuit 2 and the battery cooling water circuit 3. When the mixing valve 16 is fully closed, the engine cooling water and the battery cooling water flow out to the cooling water circuits 2, 3 on the original sides without mixing. When the mixing valve 16 is fully opened, the engine cooling water and the battery cooling water flow out to the cooling water circuits 2, 3 on the other sides without mixing. When the mixing valve 16 is between fully closed and fully open, the engine cooling water and the battery cooling water are mixed at a rate corresponding to the opening degree of the mixing valve 16, and then flow out to the cooling water circuits 2, 3 as mixed cooling water. However, the configuration of the mixing valve 16 is not limited to the above, as long as the valve has a function of mixing the cooling water according to the opening degree.

A controller 17 is installed in the vehicle, and this controller 17 includes an engine temperature control unit 18 and a battery temperature control unit 19. The engine temperature control unit 18 controls the bypass valve 10 and the cooling water pump 7 to adjust the temperature of the engine 4. The battery temperature control unit 19 controls the PTC heater 14 and the cooling water pump 13 to adjust the temperature of the travel battery 5. Although each of the control units 18, 19 also has a well-known structure and will not be described in detail, an example of the control of the bypass valve 10 by the engine temperature control unit 18 will be described.

Figure 2:
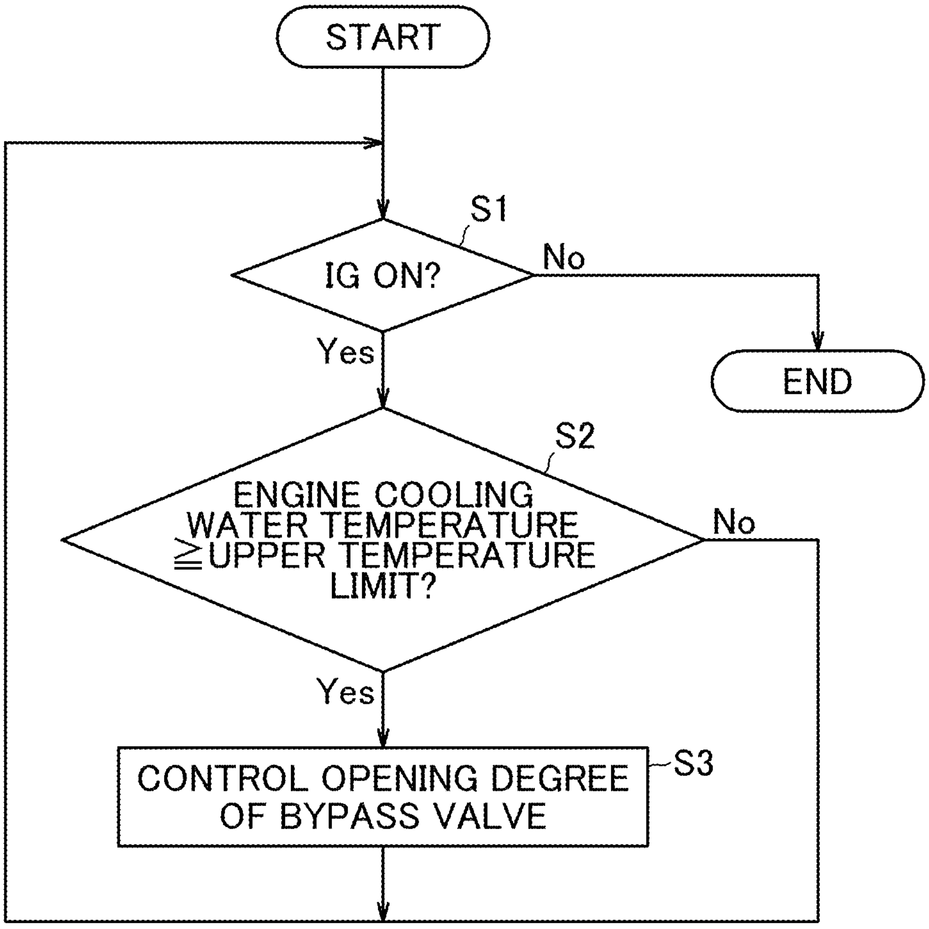
FIG. 2 is a flowchart illustrating a bypass valve switching routine executed by an engine temperature control unit of a controller.

The engine temperature control unit 18 executes a bypass valve switching routine illustrated in FIG. 2 at predetermined control intervals. Note that it is assumed that at the beginning of the routine, the bypass valve 10 is switched to the bypass path side. First, in step S1, the engine temperature control unit 18 determines whether the ignition switch of the vehicle has been turned on, and ends the routine when making a No (negative) determination. When the determination in step S1 is Yes (affirmative), the process proceeds to step S2 to determine whether the engine cooling water temperature is equal to or higher than a preset upper temperature limit. Here, an engine-side inflow temperature Tin1, which will be described later, may be applied as the engine cooling water temperature. When the determination is No, the process returns to step S1, and the processes of steps S1 and S2 are repeated. This holds the bypass valve 10 on the bypass path 9 side, whereby the engine cooling water circulates in the engine cooling water circuit 2 without being cooled by the radiator 8.

The engine cooling water temperature gradually rises due to the heat received from the engine 4, and when the determination in step S2 becomes Yes, the engine temperature control unit 18 proceeds to step S3 and controls the opening degree of the bypass valve 10 to the radiator 8 side. At this time, the bypass valve 10 is controlled so that, for example, the larger the deviation between the engine cooling water temperature and the upper temperature limit, the greater the increase in the opening area of the bypass valve 10 on the radiator 8 side. Then, when heat dissipation by the radiator 8 gradually lowers the engine cooling water temperature, the opening area of the bypass valve 10 on the radiator 8 side gradually decreases accordingly by the process of step S3. When the determination of step S2 turns from Yes to No, the bypass valve 10 is returned to the initial switching state to the bypass path 9 side. This routine is repeated to hold the engine 4 in the suitable temperature range.

In addition to the above control, the controller 17 of the present embodiment controls the opening degree of the mixing valve 16 to utilize the heat of the engine cooling water for warming the travel battery 5. Hereinafter, this control is referred to as an opening degree control of the mixing valve 16, and the control is executed by a mixing control unit 20 provided in the controller 17.

Figure 3:
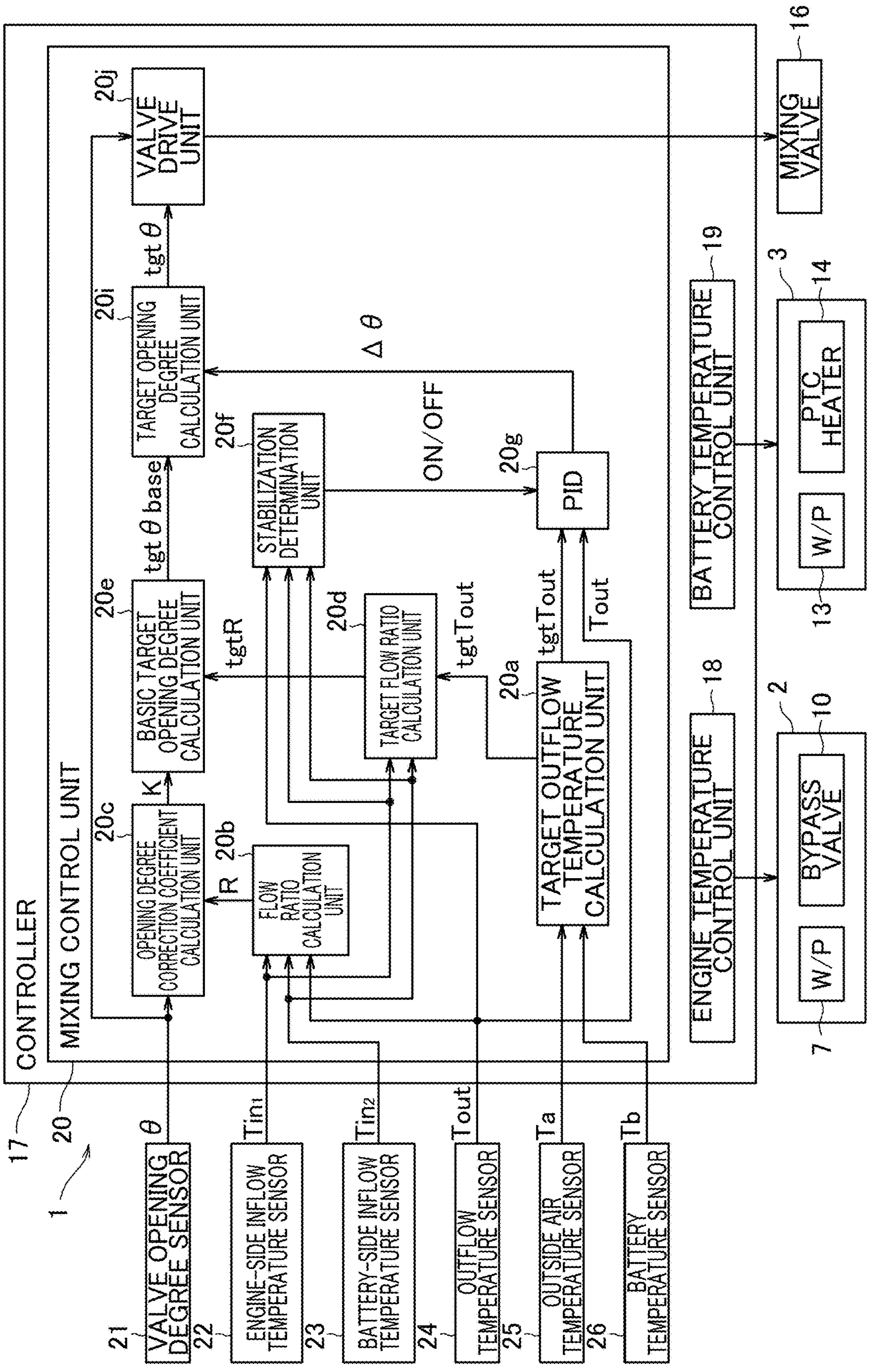
FIG. 3 is a block diagram illustrating the functional configuration of the controller.

FIG. 3 is a block diagram illustrating the functional configuration of the controller 17.

As illustrated in FIGS. 1 and 3, various sensors are connected to the input side of the controller 17, including: a valve opening degree sensor 21 that detects an opening degree θ of the mixing valve 16; an engine-side inflow temperature sensor 22 that detects the temperature of the engine cooling water flowing from the engine cooling water circuit 2 into the mixing valve 16 as the engine-side inflow temperature Tin1; a battery-side inflow temperature sensor 23 that detects the temperature of battery cooling water flowing from the battery cooling water circuit 3 into the mixing valve 16 as a battery-side inflow temperature Tin2; an outflow temperature sensor 24 that detects the temperature of the mixed cooling water flowing from the mixing valve 16 to the battery cooling water circuit 3 as an outflow temperature Tout; an outside air temperature sensor 25 that detects an outside air temperature Ta; and a battery temperature sensor 26 that detects a temperature Tb of the travel battery 5.

In the present embodiment, the valve opening degree sensor 21 corresponds to the "valve opening degree detection unit" of the present invention, the engine-side inflow temperature sensor 22 that detects the engine-side inflow temperature Tin1 corresponds to "the first inflow temperature detection unit detecting the first inflow temperature" of the present invention, and the battery-side inflow temperature sensor 23 that detects the battery-side inflow temperature Tin2 corresponds to "the second inflow temperature detection unit detecting the second inflow temperature" of the present invention. The outflow temperature sensor 24 that detects the outflow temperature Tout of the mixed cooling water flowing out to the battery cooling water circuit 3 corresponds to "the outflow temperature detection unit detecting the outflow temperature of the mixed heat medium" of the present invention.

Further, various devices are connected to the output side of the controller 17, including the mixing valve 16, the cooling water pump 7 and the bypass valve 10 of the engine cooling water circuit 2, the cooling water pump 13 of the battery cooling water circuit 3, and the PTC heater 14. As described above, the engine temperature control unit 18 controls the cooling water pump 7 and the bypass valve 10, and the battery temperature control unit 19 controls the cooling water pump 13 and the PTC heater 14.

The mixing control unit 20 of the controller 17 includes a target outflow temperature calculation unit 20*a*, a flow ratio calculation unit 20*b*, an opening degree correction coefficient calculation unit 20*c*, a target flow ratio calculation unit 20*d*, a basic target opening degree calculation unit 20*e*, a stabilization determination unit 20*f*, a PID control unit 20*g*, a target opening degree calculation unit 20*i*, and a valve drive unit 20*j*. The PID control unit 20*g* corresponds to the feedback control unit of the present invention.

The target outflow temperature calculation unit 20*a* calculates a target outflow temperature tgtTout as the target value of the outflow temperature Tout, which can hold the travel battery 5 in the suitable temperature range, based on the outside air temperature Ta detected by the outside air temperature sensor 25 and the battery temperature Tb detected by the battery temperature sensor 26. This calculation process is performed based on, for example, a control map that defines the relationship between the outside air temperature Ta, the battery temperature Tb, and the target outflow temperature tgtTout. Here, the target outflow temperature tgtTout is not necessarily based on the outside air temperature Ta and the battery temperature Tb, and may be calculated based on the battery temperature Tb, for example.

Based on the engine-side inflow temperature Tin1 detected by the engine-side inflow temperature sensor 22, the battery-side inflow temperature Tin2 detected by the battery-side inflow temperature sensor 23, and the outflow temperature Tout detected by the outflow temperature sensor 24, the flow ratio calculation unit 20*b* calculates the flow ratio R as the ratio of the engine cooling water contained in the mixed cooling water flowing out from the mixing valve 16 to the battery cooling water circuit 3, according to the following Equation (1):

[Math 1]

$$R = \frac{(Tout - Tin2)}{(Tin1 - Tin2)}. \tag{1}$$

Based on the flow ratio R calculated by the flow ratio calculation unit 20*b* and the opening degree θ of the mixing valve 16 detected by the valve opening degree sensor 21, the opening degree correction coefficient calculation unit 20*c* calculates an opening degree correction coefficient K, which defines the relationship between the flow ratio R and the opening degree θ of the mixing valve 16, according to the following Equation (2):

[Math 2]

$$K = \frac{\theta}{R}. \tag{2}$$

Based on the engine-side inflow temperature Tin1, the battery-side inflow temperature Tin2, and the target outflow temperature tgtTout calculated by the target outflow temperature calculation unit 20*a*, the target flow ratio calculation unit 20*d* calculates a target flow ratio tgtR as the target value of the flow ratio R for achieving the target outflow temperature tgtTout according to the following Equation (3):

[Math 3]

$$tgt\ R = \frac{(tgt\ Tout - Tin2)}{(Tin1 - Tin2)}. \tag{3}$$

Based on the opening degree correction coefficient K calculated by the opening degree correction coefficient calculation unit 20*c* and the target flow ratio tgtR, the basic target opening degree calculation unit 20*e* calculates a basic target opening degree tgtθbase as the target value of the opening degree θ of the mixing valve 16 for achieving the target outflow temperature tgtTout according to the following Equation (4):

$$tgt\theta\text{base} = K \times tgtR. \tag{4}$$

The stabilization determination unit 20*f* determines whether the mixed state of the engine cooling water and the battery cooling water according to the opening degree θ of the mixing valve 16 has been stabilized. More specifically, the stabilization determination unit 20*f* determines that the mixed state has been stabilized when the engine-side inflow temperature Tin1, the battery-side inflow temperature Tin2, and the outflow temperature Tout each fall within a predetermined fluctuation range over a predetermined period of time. Here, the determination that the mixed state has been stabilized is not necessarily based on each of the temperatures Tin1, Tin2, and Tout, and may be made when, for example, the fluctuation state of the outflow temperature Tout falls within a predetermined fluctuation range over a predetermined period of time.

When the stabilization determination unit 20*f* determines that the temperatures Tin1, Tin2, and Tout are stabilized, the PID control unit 20*g* calculates a basic water temperature deviation as the deviation between the outflow temperature Tout and the target outflow temperature tgtTout. Then, an opening degree correction amount 40 is calculated based on a proportional term P, an integral term I, and a differential term D obtained from the basic water temperature deviation.

The target opening degree calculation unit 201 adds the opening degree correction amount 40 calculated by the PID control unit 20*g* to the basic target opening degree tgtθbase calculated by the basic target opening degree calculation unit 20*e* to calculate a target opening degree tgtθ. When the stabilization determination unit 20*f* does not determine that the mixed state has been stabilized, the PID control unit 20*g* does not calculate a water temperature deviation ΔT, and the target opening degree calculation unit 20*i* sets the basic target opening degree tgtθbase as the target opening degree tgtθ. Therefore, in this case, PID control based on the water temperature deviation ΔT is discontinued.

The valve drive unit 20*j* drives and controls the mixing valve 16 based on the deviation between the target opening degree tgtθ and the opening degree θ of the mixing valve 16 so that the opening degree θ becomes equal to the target opening degree tgtθ.

In addition to the opening degree control of the mixing valve 16, the mixing control unit 20 also executes, for example, control for raising the temperature of the travel battery 5 by holding the mixing valve 16 fully open to cause the engine cooling water to flow out to the battery cooling water circuit 3, as in the technique of Patent Literature 1. However, since this is not directly related to the gist of the present invention, the detailed description thereof will be omitted.

Figure 4:
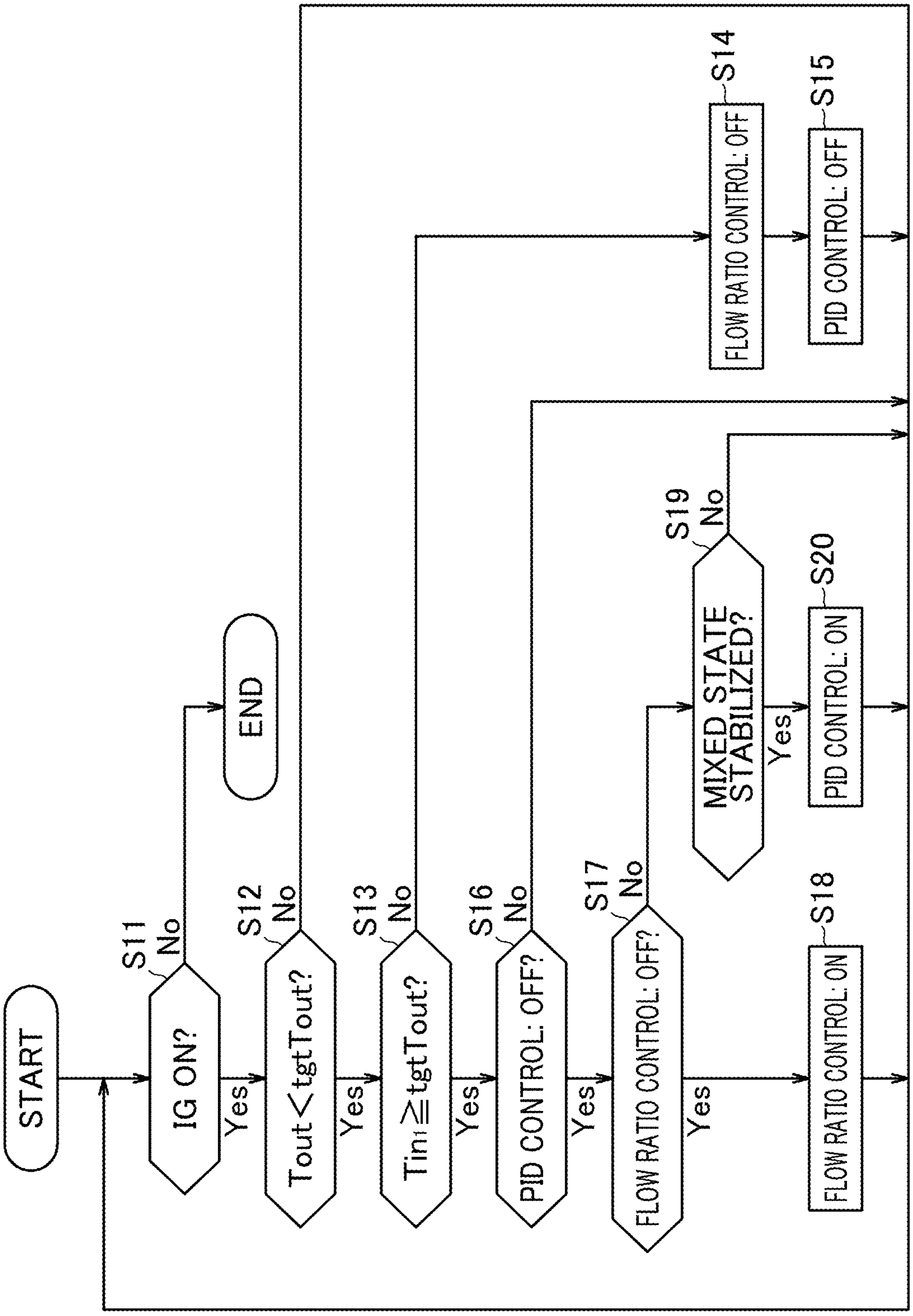
FIG. 4 is a flowchart illustrating a mixing valve opening control routine executed by the mixing control unit of the controller.

The mixing control unit 20 of the controller 17 configured as described above executes a mixing valve opening control routine illustrated in FIG. 4 at predetermined control intervals. This routine is executed regardless of whether the engine 4 is running or stopped, and is executed in parallel with the control by the engine temperature control unit 18 when the engine 4 is running. The routine may be executed in parallel with the control by the battery temperature control unit 19. For convenience of description, it is assumed that the mixing valve 16 at the beginning of the routine is kept fully closed.

First, in step S11, the mixing control unit 20 determines whether the ignition switch of the vehicle has been turned on, and ends the routine when making a No determination. When the determination in step S11 becomes Yes, the process proceeds to step S12 to determine whether the outflow temperature Tout is less than the target outflow temperature tgtTout, and when the determination is No, the warming of the travel battery 5 is regarded as unnecessary, and the flow returns to step S11. When the determination in step S12 becomes Yes, due to the requirement of warming the travel battery 5, the process proceeds to step S13 to determine whether the engine-side inflow temperature Tin1 is equal to or higher than the target outflow temperature tgtTout, in other words, whether the engine cooling water has enough heat to warm the travel battery 5. When the determination is No, flow ratio control is turned off in step S14, PID control is turned off in the following step S15, and the process returns to step S11.

Flow ratio control is executed mainly by the target outflow temperature calculation unit 20*a*, the flow ratio calculation unit 20*b*, the opening degree correction coefficient calculation unit 20*c*, the target flow ratio calculation unit 20*d*, the basic target opening degree calculation unit 20*e*, and the valve drive unit 20*j*. This is a process of controlling the opening degree of the mixing valve 16 based on the calculated basic target opening degree tgtθbase, and the details of which will be described later. PID control is mainly executed by the PID control unit 20*g*, and its process is a PID control process based on the water temperature deviation ΔT. Accordingly, when the determination in step S13 is No, neither flow ratio control nor PID control is executed, and the mixing valve 16 is kept fully closed, whereby the cooling water is circulated individually in the engine cooling water circuit 2 and the battery cooling water circuit 3.

When the determination in step S13 becomes Yes, the process proceeds to step S16 to determine whether PID control has been turned off. At the beginning of the routine, PID control has been turned off in step S15, so that a Yes determination is made, and the process proceeds to step S17. In step S17, it is determined whether flow ratio control has been turned off, and a Yes determination is made because flow ratio control has been turned off in step S14, and flow ratio control is turned on in step S18. Then, the process returns to step S11.

When the process proceeds to step S17 again, a No determination is made because flow ratio control has been turned on. In step S19, it is determined whether the mixed state of the engine cooling water and the battery cooling water has been stabilized. The process of step S19 is executed by the stabilization determination unit 20*f* in FIG. 3. When flow ratio control is started, the mixing of the engine cooling water and the battery cooling water is started according to the opening degree θ of the mixing valve 16, and the mixed state, in other words, the flow ratio R, which fluctuated at the beginning, is gradually stabilized. Therefore, before the stabilization of the mixed state at the beginning of flow ratio control, the processes of steps S11 to 13, 16, 17, and 19 are repeated based on the No determination in step S19. Since flow ratio control has already been turned on in step S18, only flow ratio control is continuously executed at this time.

When the mixed state of the engine cooling water and the battery cooling water is stabilized, the determination in step S19 turns to Yes, and the process proceeds to step S20. In step S20, PID control is turned on, and then the process returns to step S11. When the process proceeds to step S16 again, a No determination is made because PID control has been turned on, and the processes of steps S11 to 13 and 16 are repeated. Therefore, after the mixed state is stabilized, PID control is continuously executed in parallel with flow ratio control.

Figure 5:
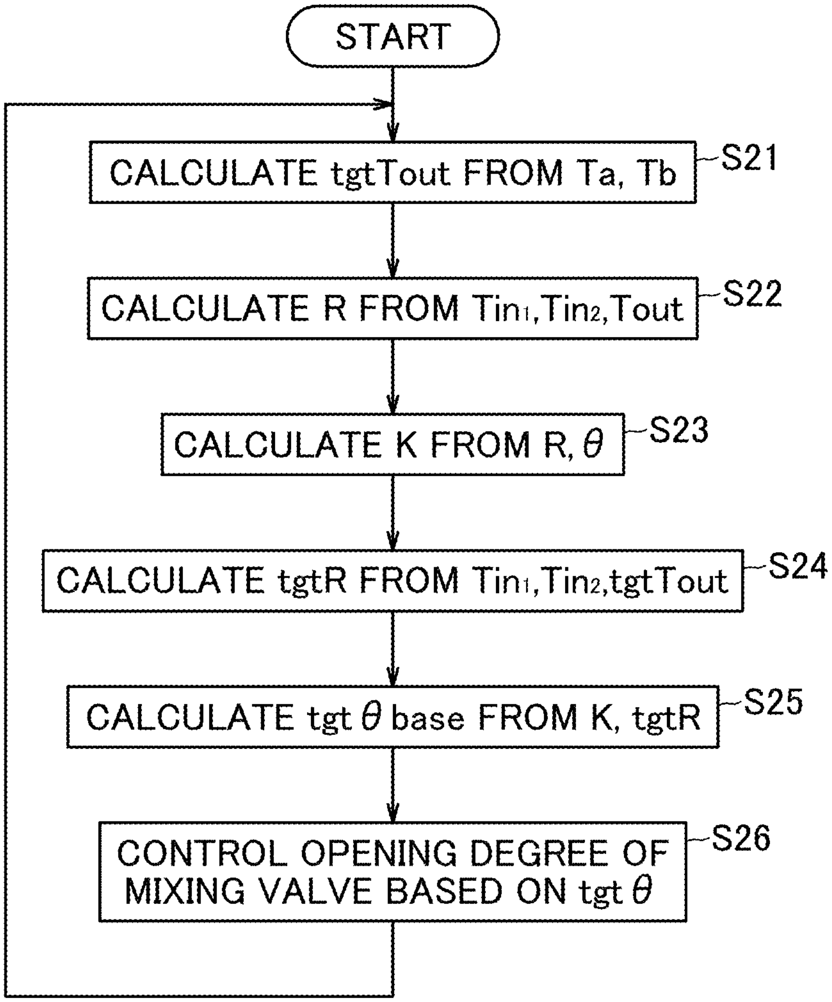
FIG. 5 is a flowchart illustrating a flow ratio control routine executed by the mixing control unit of the controller.

Meanwhile, during the period when flow ratio control is on in step S18, the mixing control unit 20 executes a flow ratio control routine illustrated in FIG. 5 at predetermined control intervals.

First, in step S21, the mixing control unit 20 calculates the target outflow temperature tgtTout based on the outside air temperature Ta and the battery temperature Tb using a control map (not illustrated). Next, in step S22, the flow ratio R is calculated according to the above Equation (1) based on the engine-side inflow temperature Tin1, the battery-side inflow temperature Tin2, and the outflow temperature Tout. Further, in step S23, the opening degree correction coefficient K is calculated according to the above Equation (2) based on the flow ratio R and the opening degree θ of the mixing valve 16. In step S24, the target flow ratio tgtR is calculated according to the above Equation (3) based on the engine-side inflow temperature Tin1, the battery-side inflow temperature Tin2, and the target outflow temperature tgtTout. In step S25, the basic target opening degree tgtθbase is calculated according to the above Equation (4) based on the opening degree correction coefficient K and the target flow ratio tgtR. In the following step S26, the opening degree of the mixing valve 16 is controlled based on the target opening degree tgtθ.

The process of step S21 is executed by the target outflow temperature calculation unit 20*a* in FIG. 3, the process of step S22 is executed by the flow ratio calculation unit 20*b* in FIG. 3, and the process of step S23 is executed by the opening degree correction coefficient calculation unit 20*c* in FIG. 3. The process of step S24 is executed by the target flow ratio calculation unit 20*d* in FIG. 3, the process of step S25 is executed by the basic target opening degree calculation unit 20*e* in FIG. 3, and the process of step S26 is executed by the valve drive unit 20*j* in FIG. 3.

Since PID control is turned off before the stabilization of the mixed state of the engine cooling water and the battery cooling water, the basic target opening degree tgtθbase calculated in step S25 is set as the target opening degree tgtθ and applied to the opening degree control of the mixing valve 16 in step S26. When PID control is started before the stabilization of the mixed state, there is a possibility that the essential flow ratio control may not be properly executed due to interference between the two controls. To prevent such a situation, PID control waits until the mixed state is stabilized. After the mixed state has been stabilized, PID control is executed in parallel with flow ratio control, and in step S26, the target opening degree tgtθ, obtained by adding the opening degree correction amount 40 based on PID control to the basic target opening degree tgtθbase, is applied to the opening degree control of the mixing valve 16.

Then, using the above control, the opening degree θ of the mixing valve 16 is adjusted to the target opening degree tgtθ, and the battery cooling water circulating in the battery cooling water circuit 3 is mixed with the engine cooling water and adjusted to the target outflow temperature tgtTout.

Next, the effects of the temperature adjustment apparatus 1 of the present embodiment will be described.

Figure 6:
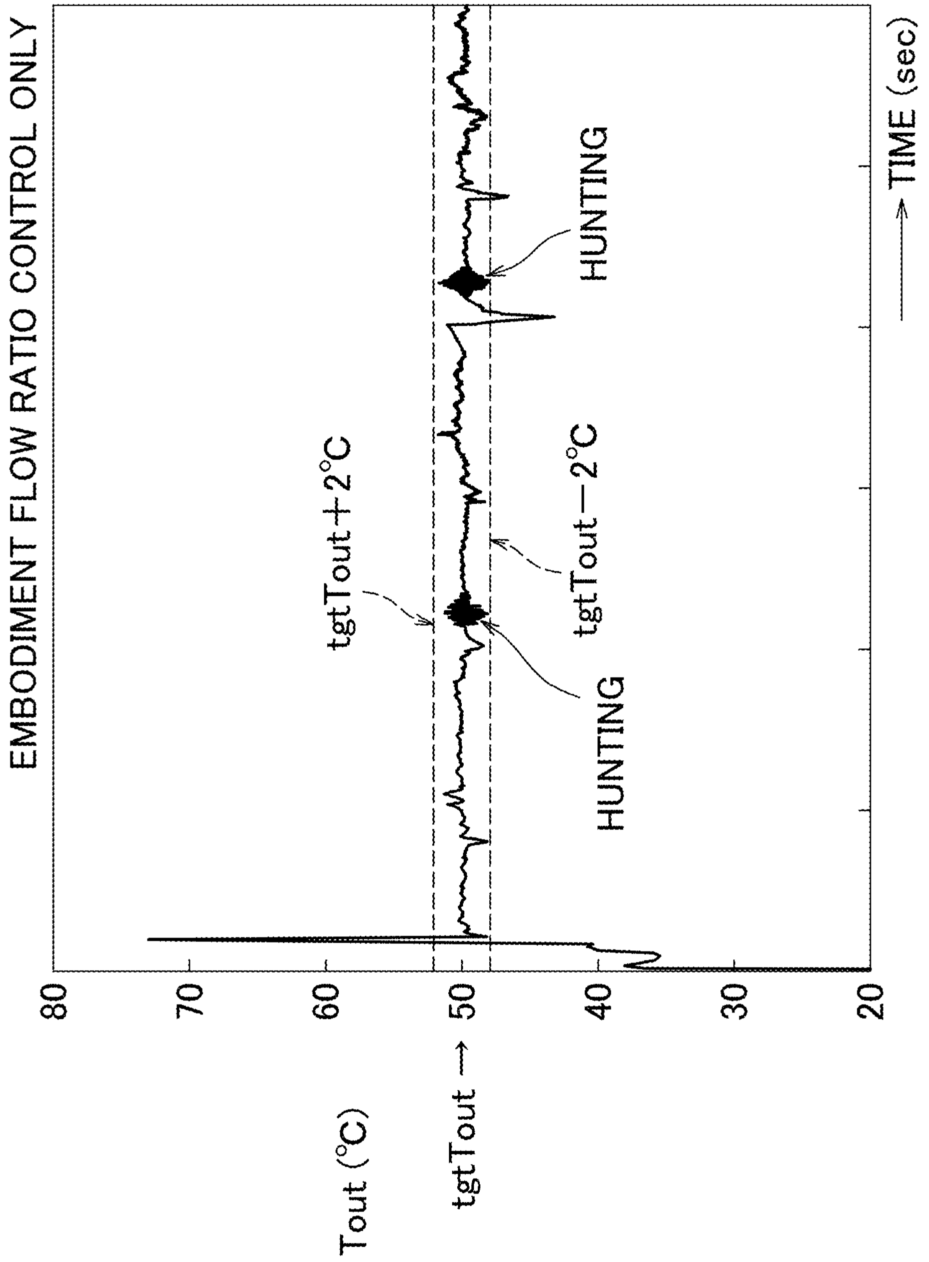
FIG. 6 is a test result illustrating a control status of an outflow temperature when flow ratio control is executed independently.
Figure 7:
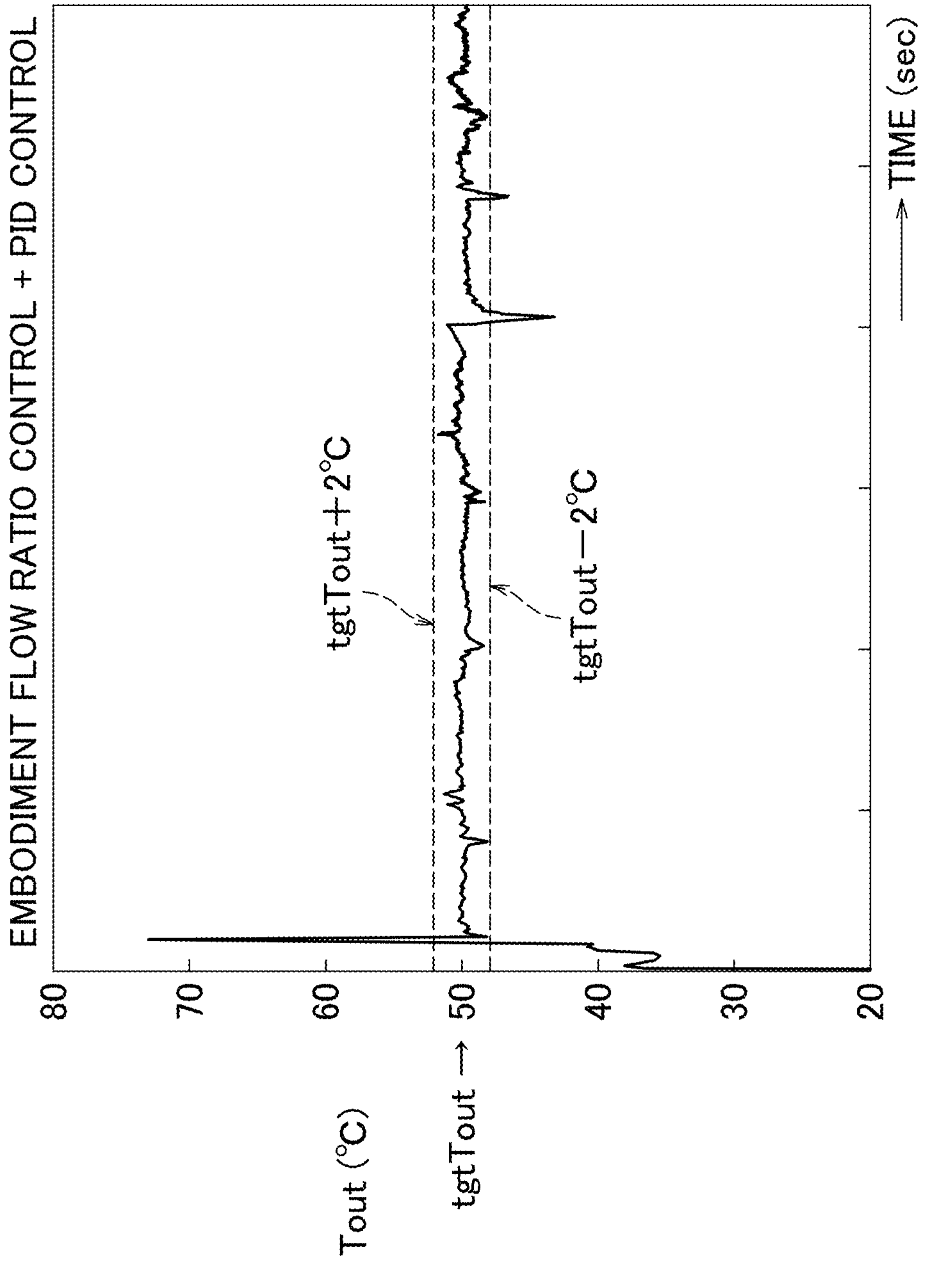
FIG. 7 is a test result illustrating a control status of an outflow temperature when proportional-integral-differential (PID) control is executed in parallel with flow ratio control.
Figure 8:
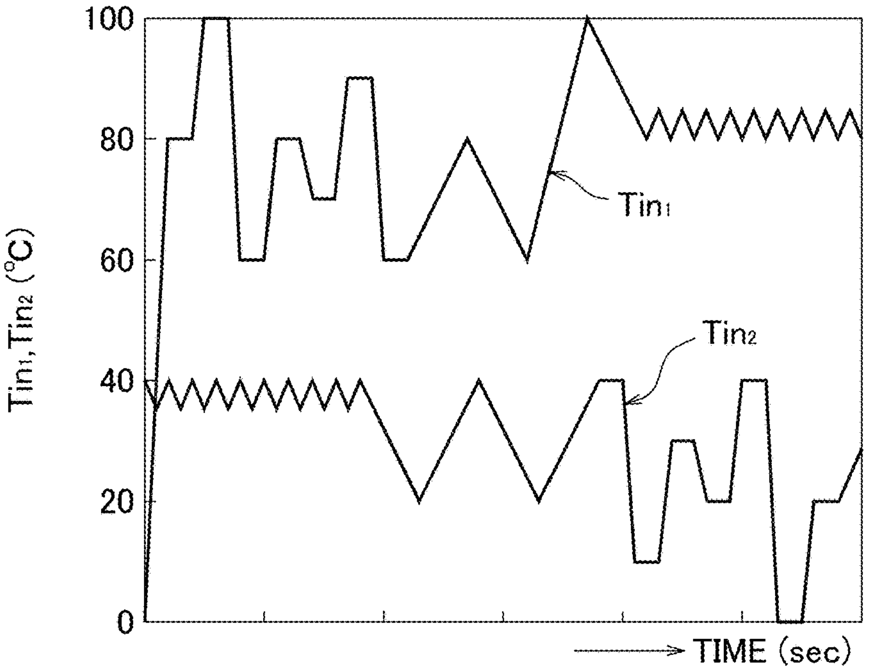
FIG. 8 is a time chart illustrating test conditions regarding an engine-side inflow temperature and a battery-side inflow temperature.
Figure 9:
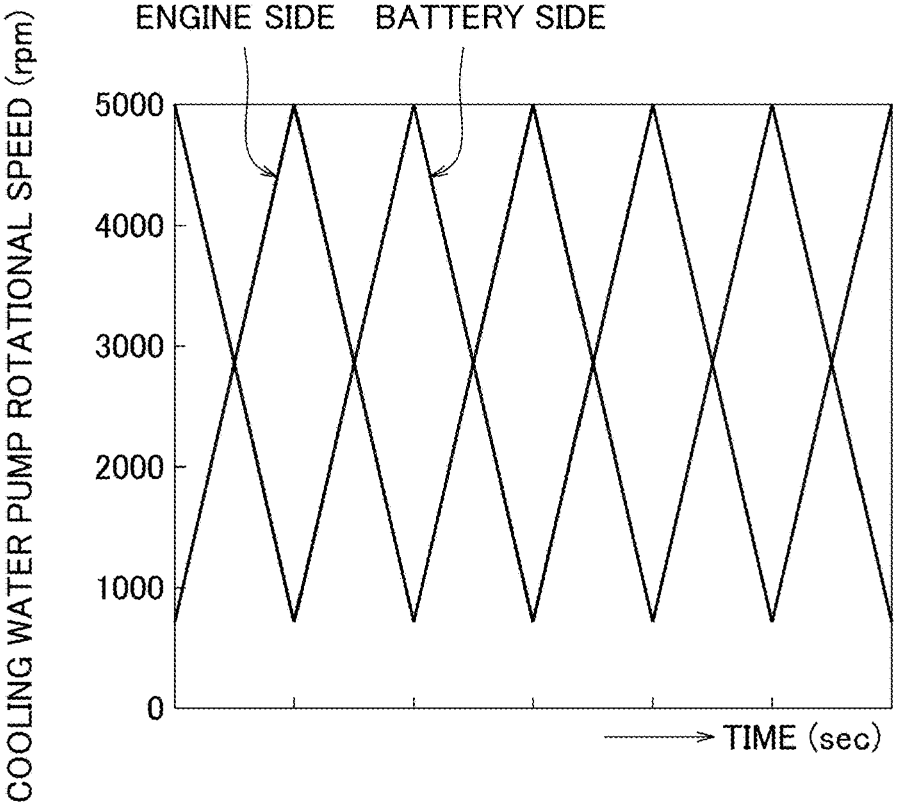
FIG. 9 is a time chart illustrating test conditions regarding a rotational speed of a cooling water pump.

FIG. 6 illustrates the control status of the outflow temperature Tout when flow ratio control is executed independently. FIG. 7 illustrates the control status of the outflow temperature Tout when PID control is executed in parallel with flow ratio control. As test conditions, as illustrated in FIG. 8, the engine-side inflow temperature Tin1 and the battery-side inflow temperature Tin2 were subjected to random fluctuations. Further, as illustrated in FIG. 9, the rotational speeds of the cooling water pumps 7, 13 on the engine side and the battery side were subjected to periodical fluctuations in mutually opposite directions, thereby fluctuating the respective flow rates of the engine cooling water and the battery cooling water. Under such test conditions, the target outflow temperature tgtTout was set to 50° C., and the actual outflow temperature Tout was measured.

In FIGS. 6 and 7, the outflow temperature Tout is substantially held within a range of about 50±2° C., indicating that the outflow temperature Tout can be controlled with high accuracy. In FIG. 6, hunting has occurred in the outflow temperature Tout, but in FIG. 7, it can be seen that hunting has been suppressed, and this test result can be regarded as an effect exerted mainly by derivative (D) control. However, a steady-state deviation may occur in the outflow temperature Tout depending on the specifications of the temperature adjustment apparatus 1 including the cooling water circuits, and in this case, integral (I) control effectively functions to suppress the steady-state deviation. As described above, sufficient effects can be obtained even when proportional-derivative (PD) or proportional-integral (PI) control is executed instead of PID control, depending on the specifications of the temperature adjustment apparatus 1. Therefore, the "feedback control" of the present invention is not limited to PID control but may be PD control or PI control.

Figure 10:
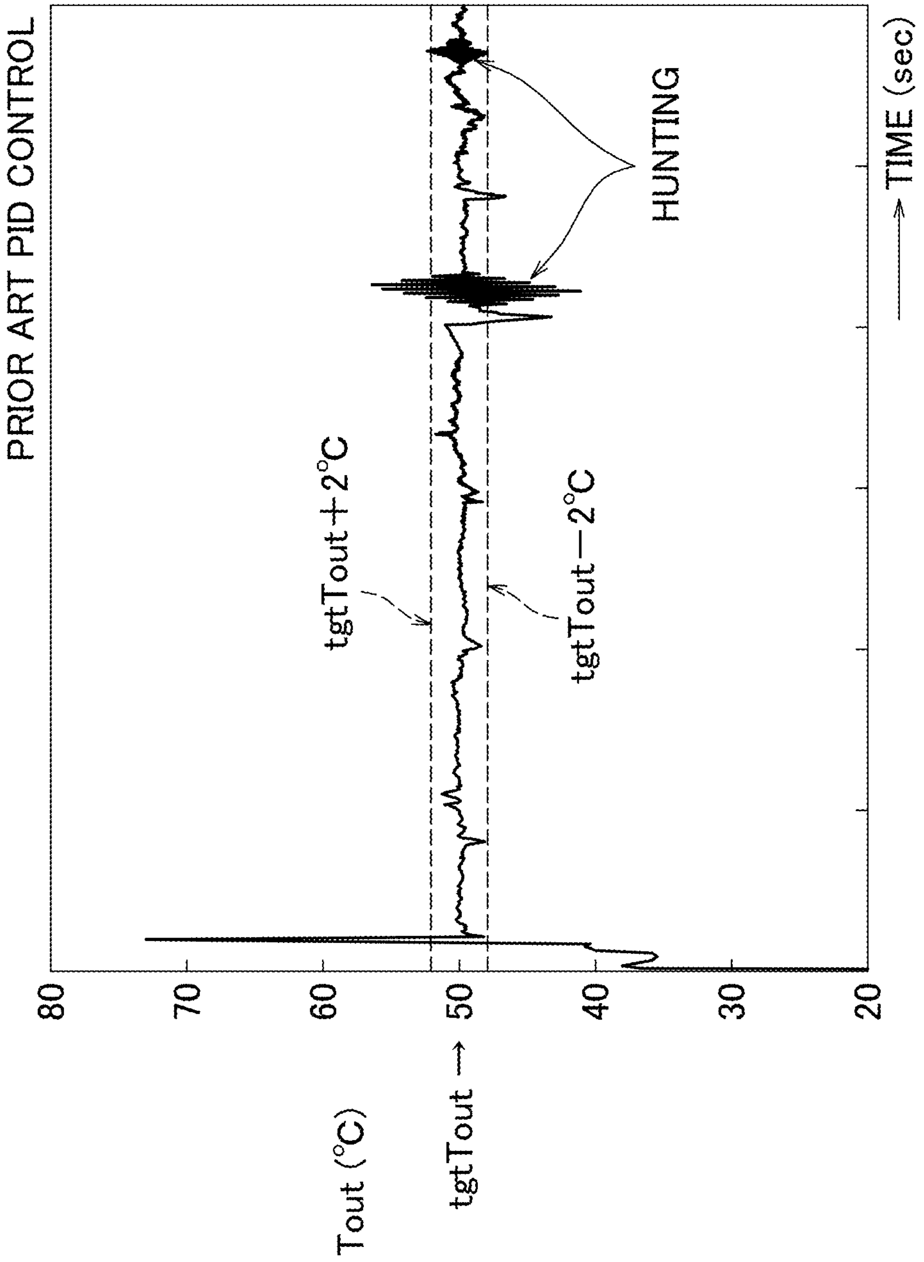
FIG. 10 is a test result illustrating a control status of an outflow temperature using general PID control.

FIG. 10 illustrates the control status of the outflow temperature Tout using general PID control in which the opening degree θ of the mixing valve 16 is fed back based on the deviation ΔT between the target outflow temperature tgtTout and the outflow temperature Tout without executing flow ratio control. FIGS. 8 and 9 are set as test conditions as in FIGS. 6 and 7. In this case, significant hunting has occurred in the outflow temperature Tout, indicating poor robustness against flow rate fluctuations. The hunting illustrated in FIG. 10 is more significant than the hunting in FIG. 6 when flow ratio control is executed independently, indicating that even when flow ratio control is executed independently, better control can be realized compared to general PID control. Accordingly, only flow ratio control may be executed independently without executing PID control in parallel, and such an aspect is also included in the present invention.

When the control by the engine temperature control unit 18 and the battery temperature control unit 19 is performed in parallel with flow ratio control, the temperatures of the engine cooling water and the battery cooling water constantly fluctuate, and the respective flow rates constantly fluctuate together with the rotational speed of the cooling water pumps 7, 13. The test result illustrated in FIGS. 6 and 7 can be regarded as evidence that the outflow temperature Tout can be properly controlled even in such a situation.

In Patent Literature 1, details were unclear on controlling the opening degree of the switching valve, the rotation of the pump, and other factors during the mixing of the engine cooling water and the battery cooling water.

In contrast, in the present embodiment, the above description clarifies the details of controlling the opening degree of the mixing valve 16, and also shows that the outflow temperature Tout can be controlled more properly by controlling the opening degree of the mixing valve 16, for example, regardless of the details of controlling the rotation of the cooling water pumps 7, 13. As a result, according to the flow ratio control of the present embodiment, the engine cooling water and the battery cooling water can be properly mixed using the mixing valve 16 and effectively utilized for warming the travel battery 5.

Meanwhile, the feature of the flow ratio control of the present embodiment is simply expressed as follows: the flow ratio R is calculated by detecting the engine-side inflow temperature Tin1, the battery-side inflow temperature Tin2, and the outflow temperature Tout, the opening degree correction coefficient K is calculated based on the flow ratio R and the opening degree θ of the mixing valve 16, and the opening degree of the mixing valve 16 is controlled using the opening degree correction coefficient K as an index.

For example, as a method for controlling the opening degree of the mixing valve 16, it is conceivable to detect the respective flow rates of the engine cooling water flowing into the mixing valve 16, the battery cooling water flowing into the mixing valve 16, and the mixed cooling water flowing out from the mixing valve 16 to the battery cooling water circuit 3, and to control the opening degree of the mixing valve 16 using the relationship between these flow rates and the opening degree θ of the mixing valve 16 as an index. However, compared to the temperature sensors 22 to 24, the flow rate sensor is heavier and requires more space, making its installation in the vehicle difficult. Moreover, the high manufacturing cost of the flow rate sensor contributes to an increase in the cost of the temperature adjustment apparatus 1. According to the present embodiment, since the opening degree of the mixing valve 16 can be controlled based on the temperatures Tin1, Tin2, and Tout detected by the temperature sensors 22 to 24, which are lighter and smaller than the flow rate sensor. This can improve the ease of installation in the vehicle and reduce the manufacturing cost compared to when the flow rate sensor is used.

For example, the temperature sensors 22 to 24 may already be provided in the vehicle for use in controlling the engine temperature control unit 18 and the battery temperature control unit 19. In this case, it is possible to achieve further cost reduction using the detection information from the existing temperature sensors 22 to 24.

The general PID control illustrated in FIG. 10 as described above not only has poor robustness against flow rate fluctuations but also requires switching the PID control gain in response to factors such as the flow fluctuations of the engine cooling water or the battery cooling water. This causes a problem of an enormous amount of time and effort being required for prior calibration to set a large number of gains.

This problem also occurs, for example, in a method of calculating the target opening degree tgtθ of the mixing valve 16 based on a preset control map. To establish such control, a large number of control maps are required in consideration of various factors such as the respective flow rates of the engine cooling water, the battery cooling water, and the mixed cooling water. Thus, as in the case of general PID control, an enormous amount of time and effort is required for prior calibration.

In contrast, in the flow ratio control according to the present embodiment, the temperatures Tin1, Tin2, and Tout of the cooling water and the opening degree θ are detected as values reflecting the specifications of the cooling water circuits 2, 3, the mixing valve 16, and other components constituting the temperature adjustment apparatus 1. Based on the opening degree correction coefficient K calculated from these values, the opening degree of the mixing valve 16 is controlled. Therefore, since there is no need to set the PID control gain or control map, no prior calibration is required. Furthermore, even when the specifications of the temperature adjustment apparatus 1 are changed, no calibration is required to reset the gain and the control map. Even among temperature adjustment apparatuses 1 with the same specifications, there are individual differences due to manufacturing errors or the like in each unit. However, since the opening degree correction coefficient K reflects the individual differences, it is also possible to obtain an effect that the opening degree of the mixing valve 16 can be controlled more suitably without being affected by the individual differences.

Meanwhile, the flow ratio control of the present embodiment is repeated at each control interval of the controller 17, so that high control responsiveness can be realized. When the control by the engine temperature control unit 18 and the battery temperature control unit 19 is performed in parallel with flow ratio control as described above, fluctuations in the temperatures and flow rates of the engine cooling water and the battery cooling water are significantly higher than when these controls are not performed. However, as described above based on the test result of FIGS. 6 and 7, even in such a situation, the outflow temperature Tout can be properly controlled by following fluctuations in the temperature and flow rate of each cooling water. This is because the flow ratio R corresponding to fluctuations in the temperature and flow rate of each cooling water, and thus the opening degree correction coefficient K, are sequentially calculated in real time using flow ratio control at each control interval, and are reflected in the opening degree control of the mixing valve 16 without delay.

As a result, flow ratio control can be accurately executed not only when the control by the engine temperature control unit 18 and the battery temperature control unit 19 is discontinued, but also when the temperature and the flow rate of each cooling water fluctuate with the execution of each control. This means that there is an increased opportunity that the heat of the engine cooling water can be effectively utilized for warming the travel battery 5. Hence it is possible to, for example, reduce the operating time of the PTC heater 14 by an amount corresponding to the utilization of the heat of the engine cooling water, thereby saving the power consumption of the in-vehicle battery as the power source.

However, the present invention is not limited to the above, and for example, flow ratio control may be executed periodically at predetermined time intervals. Alternatively, flow ratio control may be executed once when the warming of the travel battery 5 is requested, and then flow ratio control may be executed as necessary when the deviation between the outflow temperature Tout and the target outflow temperature tgtTout increases. These aspects are also included in the present invention.

By flow ratio control at each control interval, the opening degree of the mixing valve 16 is sequentially controlled based on the temperature and flow rate of each cooling water immediately before. Therefore, the mixing valve 16 does not necessarily need to have a linear opening degree characteristic. Even when the mixing valve 16 has a nonlinear opening degree characteristic, it is possible to achieve good control of the outflow temperature Tout and also obtain an effect of enabling the use of many forms of mixing valves 16.

In the present embodiment, the "powertrain" of the present invention is the engine 4, and the "powertrain cooling water circuit" of the present invention is the engine cooling water circuit 2, but the present invention is not limited to this. For example, when the present invention is applied to an electric vehicle with a motor installed as a travel power source, in-vehicle devices such as a travel motor, an inverter, and a DC-DC converter, which generate heat with operation, may be used as the "powertrain" of the present invention, and a "powertrain cooling water circuit" may be composed of a cooling water circuit for adjusting the temperature of these in-vehicle devices. No repeated description will be made, but in this case as well, similarly to the present embodiment, the heat of the powertrain cooling water can be effectively utilized for warming the travel battery 5.

Further, in the present embodiment, the travel battery 5 has been warmed by utilizing the heat of the engine cooling water, but conversely, the engine 4 may be warmed by utilizing the heat of the battery cooling water. In this Alternative Example 1, since the cooling water to be controlled is engine cooling water, the outflow temperature sensor 24 is relocated to the engine cooling water circuit 2 side, and the temperature of the mixed cooling water flowing out of the mixing valve 16 to the engine cooling water circuit 2 is detected as the outflow temperature Tout. In step S21 of FIG. 5, the target outflow temperature tgtTout is calculated as the target value of the outflow temperature Tout, which can hold the engine 4 in the suitable temperature range, based on the engine temperature and other factors. In the flowcharts of FIGS. 4 and 5, the engine-side inflow temperature Tin1 and the battery-side inflow temperature Tin2 are replaced with each other. For example, in step S13 of FIG. 4, it is determined whether the battery-side inflow temperature Tin2 is equal to or higher than the target outflow temperature tgtTout. This enables the heat of the battery cooling water to be effectively utilized for warming the engine 4.

In this Alternative Example 1, the engine cooling water circuit 2 corresponds to the "second temperature adjustment circuit" and the "powertrain cooling water circuit" of the present invention, the battery cooling water circuit 3 corresponds to the "first temperature adjustment circuit" of the present invention, the engine 4 corresponds to the "second in-vehicle device" and the "powertrain" of the present invention, and the travel battery 5 corresponds to the "first in-vehicle device" of the present invention. The cooling water corresponds to the "heat medium" of the present invention, the engine cooling water corresponds to the "second heat medium" of the present invention, and the battery cooling water corresponds to the "first heat medium" of the present invention.

The engine-side inflow temperature sensor 22 that detects the engine-side inflow temperature Tin1 corresponds to "the second inflow temperature detection unit detecting the second inflow temperature" of the present invention, and the battery-side inflow temperature sensor 23 that detects the battery-side inflow temperature Tin2 corresponds to "the first inflow temperature detection unit detecting the first inflow temperature" of the present invention. The outflow temperature sensor 24 that detects the outflow temperature Tout of the mixed cooling water flowing out to the engine cooling water circuit 2 corresponds to "the outflow temperature detection unit detecting the outflow temperature of the mixed heat medium" of the present invention.

Furthermore, by combining the control according to the present embodiment and the control according to Alternative Example 1, the heat of the engine cooling water and the heat of the battery cooling water may be mutually utilized to warm the travel battery 5 and the engine 4.

In the present embodiment, the temperature of the travel battery 5 has been raised utilizing the heat of the engine cooling water, but the travel battery 5 may need to be cooled, and in this case, the travel battery 5 may be cooled utilizing the cooling energy of the engine cooling water. In the case of this Alternative Example 2, it is determined in step S12 of FIG. 4 whether the outflow temperature Tout is equal to or more than the target outflow temperature tgtTout, and when the determination is Yes, it is determined that the cooling of the travel battery 5 is required, and the process proceeds to step S13 to determine whether the engine-side inflow temperature Tin1 is less than the target outflow temperature tgtTout. When the determination is Yes, it is assumed that the engine cooling water has the cooling energy capable of cooling the travel battery 5, and the travel battery 5 may be cooled by executing the processes from step S16. Note that the flowchart of FIG. 5 and the like are the same as those of the embodiment. Contrary to Alternative Example 2, the engine 4 may be cooled by utilizing the cooling energy of the battery cooling water.

Second Embodiment

Next, a second embodiment will be described, where the present invention is embodied in an in-vehicle device temperature adjustment apparatus 31 installed in an electric vehicle. The main difference from the first embodiment is that an air-conditioning core cooling water circuit 32 for adjusting the temperature in the vehicle cabin is provided instead of the engine cooling water circuit 2, and the heat of the cooling water is utilized to warm and cool the travel battery 5. Therefore, parts that share the same configuration with the first embodiment are denoted by the same part reference numerals and omitted from the description, and the differences are described with emphasis. In the following description, the heat utilized for warming the travel battery 5 is referred to as heating energy, and the heat utilized for cooling the travel battery 5 is referred to as cooling energy.

Figure 11:
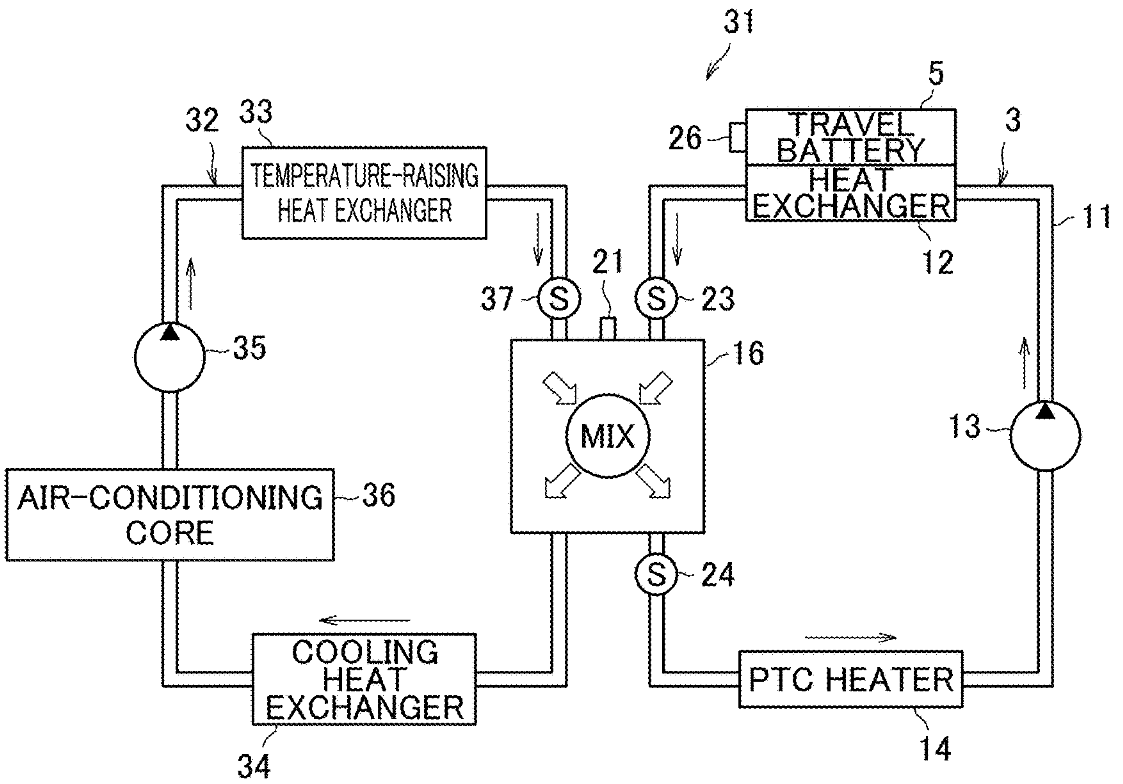
FIG. 11 is a circuit diagram illustrating a temperature adjustment apparatus according to a second embodiment.

FIG. 11 is a circuit diagram illustrating the temperature adjustment apparatus 31 of the present embodiment.

Since the configuration of the battery cooling water circuit 3 is the same as that of the first embodiment, a repeated description will be omitted. A temperature-raising heat exchanger 33, a cooling heat exchanger 34, a cooling water pump 35, and an air-conditioning core 36 are interposed in the annular air-conditioning core cooling water circuit 32. The cooling water discharged from the cooling water pump 35 circulates in the air-conditioning core cooling water circuit 32 as the air-conditioning core cooling water. Although not illustrated, a heat pump system for air-conditioning is installed in the vehicle, and a refrigerant from the heat pump system is utilized to raise or cool the temperature of the air-conditioning core cooling water circulating in the air-conditioning core cooling water circuit 32, thereby heating or cooling the vehicle cabin via the air-conditioning core 36. For example, when heating is required, the refrigerant, increased in temperature by adiabatic compression, is passed through the temperature-raising heat exchanger 33 to increase the temperature of the air-conditioning core cooling water, and air in the vehicle cabin is passed through the high-temperature air-conditioning core 36 to raise its temperature. Further, when cooling is required, the refrigerant, lowered in temperature by adiabatic expansion, is passed through the cooling heat exchanger 34 to cool the air-conditioning core cooling water, and air in the vehicle cabin is passed through the low-temperature air-conditioning core 36 for cooling.

The air-conditioning core cooling water circuit 32 configured as described above is connected to the battery cooling water circuit 3 via the mixing valve 16, thereby constituting the temperature adjustment apparatus 31. In the present embodiment, the air-conditioning core cooling water circuit 32 corresponds to the "first temperature adjustment circuit" of the present invention, the battery cooling water circuit 3 corresponds to the "second temperature adjustment circuit" of the present invention, the air-conditioning core 36 corresponds to the "first in-vehicle device" of the present invention, and the travel battery 5 corresponds to the "second in-vehicle device" of the present invention. The cooling water corresponds to the "heat medium" of the present invention, the air-conditioning core cooling water corresponds to the "first heat medium" of the present invention, and the battery cooling water corresponds to the "second heat medium" of the present invention.

Further, an air-conditioning-core-side inflow temperature sensor 37 is provided instead of the engine-side inflow temperature sensor 22 of the first embodiment, and the temperature of the air-conditioning core cooling water flowing from the air-conditioning core cooling water circuit 32 into the mixing valve 16 is detected as an air-conditioning-core-side inflow temperature Tin3. Accordingly, the air-conditioning-core-side inflow temperature sensor 37 corresponds to "the first inflow temperature detection unit detecting the first inflow temperature" of the present invention, and the battery-side inflow temperature sensor 23 that detects the battery-side inflow temperature Tin2 corresponds to "the second inflow temperature detection unit detecting the second inflow temperature" of the present invention. The outflow temperature sensor 24 that detects the outflow temperature Tout of the mixed cooling water flowing out to the battery cooling water circuit 3 corresponds to "the outflow temperature detection unit detecting the outflow temperature of the mixed heat medium" of the present invention.

In the routine of FIGS. 4 and 5, the air-conditioning-core-side inflow temperature Tin3 is applied instead of the engine-side inflow temperature Tin1. As a result, the air-conditioning core cooling water and the battery cooling water are properly mixed using the mixing valve 16, so that the heating and cooling energy of the air-conditioning core cooling water can be effectively utilized for warming and cooling the travel battery 5, and other effects can be achieved in the same manner as in the first embodiment.

In the present embodiment, the travel battery 5 has been warmed and cooled by utilizing the heating and cooling energy of the air-conditioning core cooling water, but conversely, the heating and cooling energy of the battery cooling water may be utilized to raise and cool the temperature of the air-conditioning core cooling water. In this case, the outflow temperature sensor 24 is relocated to the air-conditioning core cooling water circuit 32 side, and the temperature of the mixed cooling water flowing out from the mixing valve 16 to the air-conditioning core cooling water circuit 32 is detected as the outflow temperature Tout. The load on the heat pump system is reduced by an amount corresponding to the utilization of the heating and cooling energy of the battery cooling water, making it possible to save the power consumption of the in-vehicle battery that is the power source of the heat pump system.

Third Embodiment

Next, a third embodiment will be described, where the present invention is embodied in an in-vehicle device temperature adjustment apparatus 41 installed in a hybrid vehicle. The temperature adjustment apparatus 41 is a combination of the engine cooling water circuit 2 of the first embodiment and the air-conditioning core cooling water circuit 32 of the second embodiment, and performs a function of warming and cooling the engine 4 by utilizing the heat of the air-conditioning core cooling water. Therefore, parts that share the same configuration are denoted by the same part reference numerals and omitted from the description, and the differences are described with emphasis.

Figure 12:
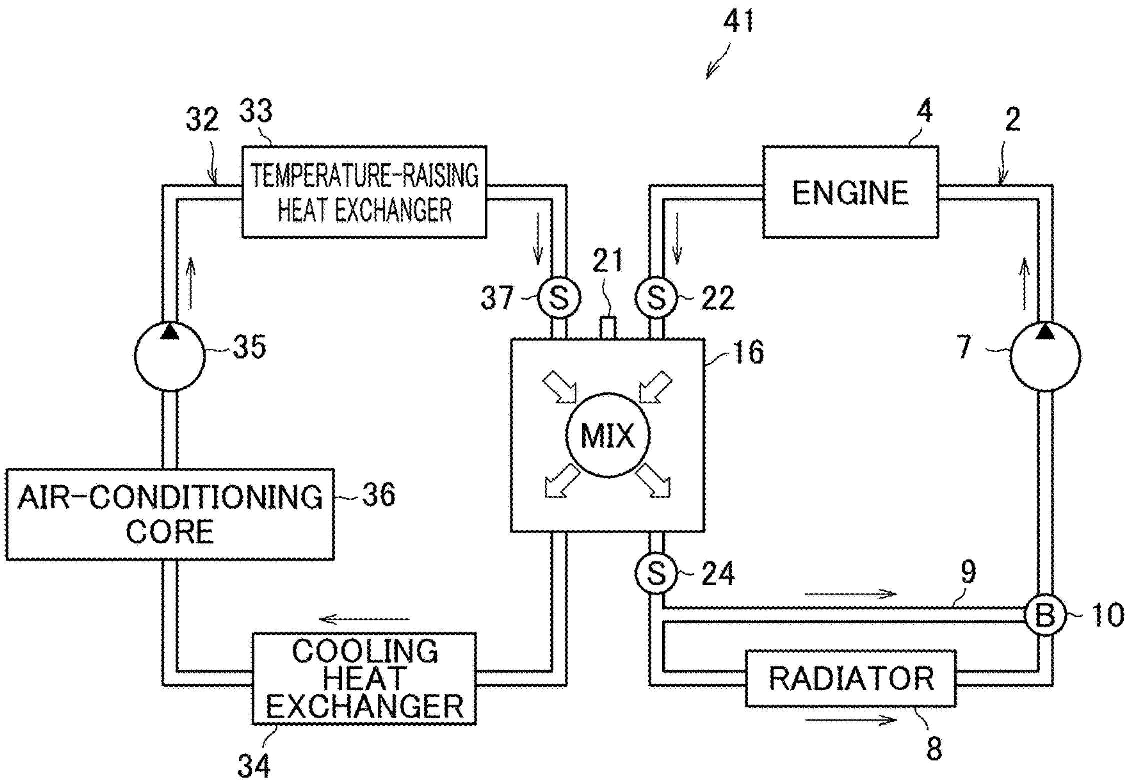
FIG. 12 is a circuit diagram illustrating a temperature adjustment apparatus according to a third embodiment.

FIG. 12 is a circuit diagram illustrating the temperature adjustment apparatus 41 of the present embodiment.

Since the configurations of the engine cooling water circuit 2 and the air-conditioning core cooling water circuit 32 are the same as those of the first and second embodiments, a repeated description will be omitted. In the present embodiment, the air-conditioning core cooling water circuit 32 corresponds to the "first temperature adjustment circuit" of the present invention, the engine cooling water circuit 2 corresponds to the "second temperature adjustment circuit" and the "powertrain cooling water circuit" of the present invention, the air-conditioning core 36 corresponds to the "first in-vehicle device" of the present invention, and the engine 4 corresponds to the "second in-vehicle device" and the "powertrain" of the present invention. The cooling water corresponds to the "heat medium" of the present invention, the air-conditioning core cooling water corresponds to the "first heat medium" of the present invention, and the engine cooling water corresponds to the "second heat medium" of the present invention.

As described above, instead of the engine 4, in-vehicle devices such as a travel motor, an inverter, and a DC-DC converter may be used as the "powertrain" of the present invention, and the "powertrain cooling water circuit" may be composed of a cooling water circuit for adjusting the temperature of these in-vehicle devices.

In the present embodiment, the outflow temperature sensor 24 is provided on the engine cooling water circuit 2 side, and the temperature of the mixed cooling water flowing out from the mixing valve 16 to the engine cooling water circuit 2 is detected as the outflow temperature Tout. At this time, the outflow temperature sensor 24 corresponds to "the outflow temperature detection unit detecting the outflow temperature of the mixed heat medium" of the present invention, the air-conditioning-core-side inflow temperature sensor 37 that detects the air-conditioning-core-side inflow temperature Tin3 corresponds to "the first inflow temperature detection unit detecting the first inflow temperature" of the present invention, and the engine-side inflow temperature sensor 22 that detects the engine-side inflow temperature Tin1 corresponds to "the second inflow temperature detection unit detecting the second inflow temperature" of the present invention.

According to the present embodiment, the air-conditioning core cooling water and the engine cooling water are properly mixed using the mixing valve 16, so that the heating and cooling energy of the air-conditioning core cooling water can be effectively utilized for warming and cooling the engine 4, and other effects can be achieved in the same manner as in the first embodiment.

In the present embodiment, the engine 4 has been warmed and cooled by utilizing the heating and cooling energy of the air-conditioning core cooling water, but conversely, the heating and cooling energy of the engine 4 may be utilized to raise and cool the temperature of the air-conditioning core cooling water. In this case, the outflow temperature sensor 24 is relocated to the air-conditioning core cooling water circuit 32 side, and the temperature of the mixed cooling water flowing out from the mixing valve 16 to the air-conditioning core cooling water circuit 32 is detected as the outflow temperature Tout. The load on the heat pump system is reduced by an amount corresponding to the utilization of the heating and cooling energy of the engine cooling water, making it possible to save the power consumption of the in-vehicle battery that is the power source of the heat pump system.

The aspect of the present invention is not limited to this embodiment. For example, in the first embodiment, the engine cooling water circuit 2 and the battery cooling water circuit 3 have been connected via the mixing valve 16. In the second embodiment, the air-conditioning core cooling water circuit 32 and the battery cooling water circuit 3 have been connected via the mixing valve 16. In the third embodiment, the air-conditioning core cooling water circuit 32 and the engine cooling water circuit 2 have been connected via the mixing valve 16. However, the present invention is not limited to these. For example, the present invention may be applied to a cooling water circuit that adjusts temperatures of in-vehicle devices other than the engine 4, the travel battery 5, and the air-conditioning core 36, or may be composed of a temperature adjustment circuit that circulates a medium other than the cooling water.

Alternatively, for example, the three cooling water circuits 2, 3, 32 may be connected to each other via the mixing valve 16. As an example, in FIG. 1, the air-conditioning core cooling water circuit 32 may be connected to the right side of the battery cooling water circuit 3 via the mixing valve 16, and the heating and cooling energy of the air-conditioning core cooling water may be utilized to warm and cool the travel battery 5 as in the case of the engine cooling water, or a combination of other cooling water circuits may be used.

REFERENCE SIGNS LIST

1, 31, 41 temperature adjustment apparatus
2 engine cooling water circuit (first temperature adjustment circuit or second temperature adjustment circuit, powertrain cooling water circuit)
3 battery cooling water circuit (first temperature adjustment circuit or second temperature adjustment circuit)

4 engine (first in-vehicle device or second in-vehicle device, powertrain)
5 travel battery (first in-vehicle device or second in-vehicle device)
16 mixing valve
20 mixing control unit
20*a* target outflow temperature calculation unit
20*b* flow ratio calculation unit
20*c* opening degree correction coefficient calculation unit
20*d* target flow ratio calculation unit
20*f* stabilization determination unit
20*g* PID control unit (feedback control unit)
20*i* target opening degree calculation unit
20*j* valve drive unit
21 valve opening degree sensor (valve opening degree detection unit)
22 engine-side inflow temperature sensor (first inflow temperature detection unit)
23 battery-side inflow temperature sensor (second inflow temperature detection unit)
24 outflow temperature sensor (outflow temperature detection unit)
32 air-conditioning core cooling water circuit (first temperature adjustment circuit or second temperature adjustment circuit)
37 air-conditioning-core-side inflow temperature sensor (first inflow temperature detection unit)

What is claimed is:

1. An in-vehicle device temperature adjustment apparatus comprising:

a first temperature adjustment circuit configured to circulate a heat medium as a first heat medium to adjust a temperature of a first in-vehicle device;

a second temperature adjustment circuit configured to circulate the heat medium as a second heat medium to adjust a temperature of a second in-vehicle device;

a mixing valve mixing the first heat medium flowing in from the first temperature adjustment circuit and the second heat medium flowing in from the second temperature adjustment circuit, at a ratio corresponding to an opening degree, to flow out to each of the first temperature adjustment circuit and the second temperature adjustment circuit as a mixed heat medium;

a valve opening degree sensor configured to detect the opening degree of the mixing valve;

a first inflow temperature sensor configured to detect, as a first inflow temperature, a temperature of the first heat medium flowing in from the first temperature adjustment circuit to the mixing valve;

a second inflow temperature sensor configured to detect, as a second inflow temperature, a temperature of the second heat medium flowing in from the second temperature adjustment circuit to the mixing valve;

an outflow temperature sensor configured to detect, as an outflow temperature, a temperature of the mixed heat medium flowing out from the mixing valve to the second temperature adjustment circuit; and a mixing controller configured to perform opening degree control on the mixing valve to mix the first heat medium and the second heat medium to adjust the temperature of the second in-vehicle device, wherein the mixing controller includes a target outflow temperature calculator configured to calculate, as a target outflow temperature, a target value of the outflow temperature based on at least the temperature of the second in-vehicle device, a flow ratio calculator configured to calculate, as a flow ratio, a ratio of the first heat medium contained in the mixed heat medium flowing out from the mixing valve to the second temperature adjustment circuit, based on the first inflow temperature, the second inflow temperature, and the outflow temperature, an opening degree correction coefficient calculator configured to calculate an opening degree correction coefficient defining a relationship between the flow ratio and the opening degree, based on the flow ratio and the opening degree of the mixing valve, a target flow ratio calculator configured to calculate, as a target flow ratio, a target value of the flow ratio based on the first inflow temperature, the second inflow temperature, and the target outflow temperature, a target opening degree calculator to calculate a target opening degree of the mixing valve based on the opening degree correction coefficient and the target flow ratio, and a drive controller configured to perform opening degree control on the mixing valve based on the target opening degree.

2. The in-vehicle device temperature adjustment apparatus according to claim 1, wherein the target outflow temperature calculator, the flow ratio calculator, the opening degree correction coefficient calculator, the target flow ratio calculator, the target opening degree calculator, and the drive controller repeat respective processes at predetermined control intervals.

3. The in-vehicle device temperature adjustment apparatus according to claim 2, wherein the mixing controller further includes a stabilization determiner configured to determine whether a mixed state of the first heat medium and the second heat medium corresponding to the opening degree control of the mixing valve has been stabilized, and a feedback controller configured to execute a feedback control including at least one of an integral term or a differential term, obtained from a deviation between the outflow temperature and the target outflow temperature, and the feedback controller is configured to start the feedback control when the stabilization determiner determines that the outflow temperature has been stabilized after starting of the opening degree control of the mixing valve.

4. The in-vehicle device temperature adjustment apparatus according to claim 3, wherein the mixing controller is configured to control the opening degree of the mixing valve to warm the second in-vehicle device when the outflow temperature is lower than the target outflow temperature and the first inflow temperature is equal to or higher than the target outflow temperature.

5. The in-vehicle device temperature adjustment apparatus according to claim 3, wherein the mixing controller is configured to control the opening degree of the mixing valve to cool the second in-vehicle device when the outflow temperature is equal to or higher than the target outflow temperature and the first inflow temperature is lower than the target outflow temperature.

6. The in-vehicle device temperature adjustment apparatus according to claim 1, wherein the mixing controller further includes a stabilization determiner configured to determine whether a mixed state of the first heat medium and the second heat medium corresponding to the opening degree control of the mixing valve has been stabilized, and a feedback controller configured to execute a feedback control including at least one of an integral term or a differential term, obtained from a deviation between the outflow temperature and the target outflow temperature, and the feedback controller is configured to start the feedback control when the stabilization determiner determines that the outflow temperature has been stabilized after starting of the opening degree control of the mixing valve.

7. The in-vehicle device temperature adjustment apparatus according to claim 6, wherein the mixing controller is configured to control the opening degree of the mixing valve to warm the second in-vehicle device when the outflow temperature is lower than the target outflow temperature and the first inflow temperature is equal to or higher than the target outflow temperature.

8. The in-vehicle device temperature adjustment apparatus according to claim 6, wherein the mixing controller is configured to control the opening degree of the mixing valve to cool the second in-vehicle device when the outflow temperature is equal to or higher than the target outflow temperature and the first inflow temperature is lower than the target outflow temperature.

9. The in-vehicle device temperature adjustment apparatus according to claim 1, wherein one of the first temperature adjustment circuit and the second temperature adjustment circuit is a powertrain cooling water circuit that adjusts a temperature of a powertrain for causing a vehicle to travel, and the other of the first temperature adjustment circuit and the second temperature adjustment circuit is a battery cooling water circuit for adjusting a temperature of a travel battery.

10. The in-vehicle device temperature adjustment apparatus according to claim 9, wherein the powertrain is an engine installed in the vehicle as a travel power source.

11. The in-vehicle device temperature adjustment apparatus according to claim 9, wherein the powertrain includes a travel motor installed in the vehicle as a travel power source, an inverter for driving the travel motor, and a direct current to direct current (DC-DC) converter.

12. The in-vehicle device temperature adjustment apparatus according to claim 1, wherein one of the first temperature adjustment circuit and the second temperature adjustment circuit is an air-conditioning core cooling water circuit for adjusting a temperature of an air-conditioning core of a vehicle, and the other of the first temperature adjustment circuit and the second temperature adjustment circuit is a battery cooling water circuit for adjusting a temperature of a travel battery.

13. The in-vehicle device temperature adjustment apparatus according to claim 1, wherein one of the first temperature adjustment circuit and the second temperature adjustment circuit is an air-conditioning core cooling water circuit for adjusting a temperature of an air-conditioning core of a vehicle, and the other of the first temperature adjustment circuit and the second temperature adjustment circuit is a powertrain cooling water circuit for adjusting a temperature of a powertrain for causing the vehicle to travel.

14. The in-vehicle device temperature adjustment apparatus according to claim 13, wherein the powertrain is an engine installed in the vehicle as a travel power source.

15. The in-vehicle device temperature adjustment apparatus according to claim 13, wherein the powertrain includes a travel motor installed in the vehicle as a travel power source, an inverter for driving the travel motor, and a direct current to direct current (DC-DC) converter.

* * * * *